UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE COLORING-MATTERS AND PROCESS OF MAKING THEM.

1,089,221. Specification of Letters Patent. Patented Mar. 3, 1914.

No Drawing. Application filed December 16, 1911. Serial No. 666,114.

*To all whom it may concern:*

Be it known that I, MAX HENRY ISLER, citizen of the Swiss Republic, residing at Mannheim, Germany, have invented new and useful Improvements in Anthraquinone Coloring-Matters and Processes of Making Them, of which the following is a specification.

I have found that new coloring matters of the anthracene series can be obtained by condensing either an aldehyde of the anthraquinone series, or an omega-dihalogen-methyl-anthraquinone, with urea or with thio-urea, the reaction being preferably effected by heating the components together at a temperature of, say, from 120° to 150° C., in the presence of a suitable solvent (such for instance as quinolin, or pyridin) until the formation of the coloring matter is complete.

My new coloring matters are characterized by being insoluble in dilute acids and alkalis, very difficultly soluble in toluene and in glacial acetic acid, soluble in nitrobenzene and also soluble in concentrated sulfuric acid yielding from yellowish brown to red solutions. With alkaline hydrosulfite they yield brown to yellow vats and dye cotton from yellow to red shades.

In this application I include both urea and thiourea under the formula

in which X includes a divalent metalloid, in particular oxygen and sulfur.

The following are examples of how my invention can be carried into practical effect, but the invention is not confined to these examples. The parts are by weight.

Example 1: Boil together, for from 2 to 3 hours, in a reflux apparatus, 30 parts of anthraquinone-2-aldehyde, 12 parts of urea, and 90 parts of pyridin. The coloring matter, which separates out in the heat, is then filtered off, washed with pyridin and dried. After re-crystallization from nitrobenzene it yields a yellow-red solution in concentrated sulfuric acid. With alkaline hydrosulfite it yields a brown-yellow vat which colors cotton brown-yellow shades which, upon exposure to the air and subsequent boiling with soap solution, become pure yellow.

Example 2: Boil together, for a few hours, in a reflux apparatus, 30 parts of anthraquinone-2-aldehyde, 12 parts of thiourea, and 60 parts of pyridin, and then work up the product in the manner described in the foregoing example. The coloring matter can be re-crystallized from nitrobenzene and then yields a reddish yellow solution in concentrated sulfuric acid. It forms a yellow-brown vat which colors cotton similar shades, which shades on washing and soaping become dark brick red.

Example 3: Boil together, for a few hours, in a reflux apparatus, 25 parts of omega-dichlor-2-methyl-anthraquinone, 10 parts of thio-urea, 50 parts of pyridin and 15 parts of anhydrous sodium acetate, and then work up the product as described in the foregoing example 1. The coloring matter can be obtained in the pure condition by extracting the crude product with glacial acetic acid and then recrystallizing from nitrobenzene. The said coloring matter yields a yellow-brown colored solution in concentrated sulfuric acid, and with alkaline hydrosulfite it yields a yellow-brown vat which dyes cotton yellowish red shades.

In a similar manner, coloring matters can be obtained from other aldehydes, or omega-dihalogen-methyl derivatives of anthraquinone. For the purposes of this invention an omega-dihalogen-methyl-anthraquinone is equivalent to the corresponding anthraquinone-aldehyde.

Now what I claim is:—

1. The process of producing coloring matter of the anthraquinone series by condensing an aldehyde of the anthraquinone series with a compound corresponding to the formula

in which X includes a divalent metalloid.

2. The process of producing coloring matter of the anthraquinone series by condensing anthraquinone-2-aldehyde with urea.

3. The new coloring matters which can be obtained by condensing an aldehyde of the anthraquinone series with a compound corresponding to the formula

in which X includes a divalent metalloid, which coloring matters are characterized by being insoluble in dilute acids and alkalis, very difficultly soluble in toluene and in glacial acetic acid, soluble in nitrobenzene and also soluble in concentrated sulfuric acid yielding from yellowish brown to red solutions, and which with alkaline hydrosulfite yield brown to yellow vats dyeing cotton from yellow to red shades.

4. The new coloring matter of the anthraquinine series which can be obtained by condensing anthraquinone-2-aldehyde with urea, which coloring matter is insoluble in dilute acids and alkalis, is very difficultly soluble in toluene and in glacial acetic acid, which after re-crystallization from nitrobenzene yields a yellow-red solution in concentrated sulfuric acid, and which with alkaline hydrosulfite yields a brown-yellow vat which dyes cotton pure yellow shades.

In testimony whereof I have hereunto set my hand in the presence of two subscribing witnesses.

MAX HENRY ISLER.

Witnesses:
J. ALEC. LLOYD,
A. O. TILLMANN.